Patented Oct. 14, 1952

2,614,085

UNITED STATES PATENT OFFICE 2,614,085

USE OF CATIONIC SURFACE ACTIVE AGENT IN PREPARATION OF ANIONIC RESIN IN BEAD FORM

Lennart A. Lundberg, Stamford, Conn., assignor to American Cyanamid Company, New York, N. Y., a corporation of Maine No Drawing. Application February 17, 1949, Serial No. 77,068

8 Claims. (Cl. 260—2)

This invention relates to ion exchange resins and more particularly, to the production of anion active resins in the form of spheroidal beads.

In the past, liquid polymerizable substances such as styrene, acrylic acid esters and the like have been polymerized in aqueous suspension to produce thermoplastic resins as granular products uniform in composition and particle size. Similarly, spheroidal particles of gels have been prepared by gelation of hydrosols in water-immiscible media. Resins of the thermosetting condensation type such as urea-formaldehyde, melamine-formaldehyde and the like, and particularly resins of the thermosetting condensation type in a cured state such as the ion exchange resins, both anionic and cationic, have however not previously been produced in the form of spheroidal particles or beads of uniform size.

It is an object of the present invention to produce an anion exchange resin active for the removal of anion from, or the exchange of anions in, fluid media in a form which can be used directly, without grinding or screening, in ion exchange processes.

It is another object of the present invention to produce an anion exchange resin in the form of spheroidal particles.

A further object of the present invention is to provide a method for preparing a condensation type, thermosetting, synthetic resin in the form of spheroidal beads.

Still another object of the present invention is to convert a partially condensed, water-soluble resin to a cured, water-insoluble anion active resin in bead form.

It is still a further object of the present invention to prepare in bead form an anion exchange resin.

A further object of the present invention is the preparation in bead form of an anion exchange resin which is a condensation product of epichlorohydrin or glycerol dichlorohydrin with a polyalkylene-polyamine.

Another object of the present invention is the preparation, in bead form, of an anion exchange resin which is a condensation product of guanidine, melamine and formaldehyde.

The above and other objects are attained by dispersing an aqueous syrup of a resinous partial condensation product of ingredients which, when fully condensed, produce an insoluble anion active resin in an inert, organic non-solvent medium by mechanical agitation and in the presence of a cationic surface active agent, and converting the partially condensed product of the dispersed globules thereby formed to an insoluble resin by heating.

The invention will be described in greater detail in conjunction with the following specific examples in which proportions are given in parts by weight. It should be understood that the examples are merely illustrative, and it is not intended that the scope of the invention be limited to the details therein set forth.

EXAMPLE 1

(1) 185 parts of resin "A" syrup
(2) 286 parts of tetrachlorethane
    214 parts of xylene
(3) 5 parts [1% of the weight of (2)] of N,N'-dioctadecyl - alpha - 2 - hydroxyethylamino-succinamide acetate
    5 parts [1% of the weight of (2)] of polystyrene (2) and (3) are charged into a suitable vessel equipped with an anchor type stirrer, a water trap and means for indicating temperature. The mix is heated to 80° C. and the stirrer adjusted to 95 R. P. M., whereupon the resin syrup (1) is added rapidly. The resulting dispersion is refluxed for 1 hour, and 76 parts of water are then removed azeotropically. Refluxing is resumed at about 130° C. for 2 hours.

The vitreous, translucent, orange beads obtained have the following size distribution: 4.6% on 20 mesh, 69.5% 20–40 mesh, 20.4% 40–60 mesh and 5.0% through 60 mesh.

The polystyrene used in this example serves as a viscosity modifier, and as such forms no part of the present invention.

EXAMPLE 2

(1) 175 parts of resin "B" syrup
(2) 489 parts of o-dichlorbenzene
    111 parts of toluene
(3) 0.6 part [0.1% of the weight of (2)] of N,N'-dioctadecyl - alpha - 2 - hydroxyethylamino-succinamide acetate The procedure of Example 1 is repeated but with an agitation speed of 150 R. P. M., 73 parts of water being removed prior to a four-hour cure under reflux at 125° C.

The size distribution of the orange resin beads obtained is as follows: 6.5% on 20 mesh, 73.5% 20–40 mesh, 15.8% 40–60 mesh and 4.2% through 60 mesh. The 20–40 mesh resin has a capacity of 16.1 kilograins per cubic foot of resin and a density of 19.3 pounds per cubic foot; the 40–60 mesh resin, a capacity of 24.5 kilograins per cubic foot of resin and a density of 20.1 pounds per cubic foot.

EXAMPLE 3

(1) 175 parts of resin "B" syrup (specific gravity 1.14)
(2) 489 part of o-dichlorbenzene (specific gravity 1.155)
    111 parts of xylene
(3) 1.8 parts [0.3% of the weight of (2)] of N,N'-dioctadecyl-alpha-2-hydroxyethylaminosuccinamide acetate The procedure of Example 1 is followed with 150 R. P. M. agitation and refluxing for 1 hour at 90°–95° C. prior to removal of 72 parts of water azeotropically. Uniformly sized beads are obtained.

EXAMPLE 4

(1) 300 parts of resin "B" syrup
(2) 750 parts of xylene
(3) 7.5 parts [1.0% of the weight of (2)] of N,N'-dioctadecyl - alpha - 2 - hydroxyethylaminosuccinamide acetate (2) and (3) are charged into a suitable vessel equipped with an anchor type stirrer, a water trap and means for indicating temperature. The mix is heated to 80° C. and the stirrer adjusted to 460 R. P. M., whereupon the resin syrup is added rapidly. The resulting dispersion is heated for 1.5 hours until 138 parts of water are removed azeotropically, and it is then refluxed for four hours at 125° C.

The yellow powder obtained has the following size distribution: a range of 1–60 microns and the bulk of the particles within the range of 15–40 microns.

EXAMPLE 5

(1) 175 parts of resin "C" syrup
(2) 655 parts of o-dichlorobenzene
(3) 1.3 parts [0.2% of the weight of (2)] of N,N'-dioctadecyl - alpha - 2 - hydroxyethylaminosuccinamide acetate (2) and (3) are charged into a suitable vessel equipped with an anchor type stirrer, a water trap and means for indicating temperature. The mix is heated to 90° C. and the stirrer adjusted to 150 R. P. M., whereupon (1) is added rapidly. The resulting dispersion is refluxed for 7.5 hours.

White, translucent, vitreous beads of resin having a capacity of 18.3 kilograins as calcium carbonate per cubic foot of resin and a density of 20.9 pounds per cubic foot are obtained in the following size distribution: 8.9% on 20 mesh, 53.5% 20–40 mesh, 24.3% 40–60 mesh and 13.3% through 60 mesh.

EXAMPLE 6

(1) 150 parts of resin "C" syrup
(2) 585 parts of o-dichlorbenzene
(3) 8.6 parts [1.5% of the weight of (2)] of stearyldimethylebenzylammonium chloride (2) and (3) are charged into a suitable vessel equipped with an anchor type stirrer, a water trap, and means for indicating temperature. The mix is heated to reflux (85°–88° C.) by steam and (1) is then added. The dispersed particles are heated for one hour; then recovered by filtration and cured in an oven at 100° C.

Preparation of resin "A" syrup (1) 189 parts of tetraethylenepentamine (1.0 mol)
(2) 277 parts of epichlorohydrin (3.0 mols)
(3) 366 parts of water (2) is added slowly to (1) and (3) with cooling to maintain the temperature at 45°–55° C. About 0.5 hour is required for the addition. The syrup is then maintained at 50° C. for 0.75–1.5 hours after completion of the addition of the epichlorohydrin, at which point it has a specific gravity of 1.18.

Preparation of resin "B" syrup

The same procedure is followed as for the preparation of resin "A" syrup except that 466 parts of water are used and after addition of all the epichlorohydrin, the syrup is maintained at 50° C. for 0.75–1.5 hours.

Preparation of resin "C" syrup (1) 126 parts of melamine
(2) 406 parts of 37% aqueous formaldehyde
(3) 21 parts of 50% triethanolamine
(4) 183 parts of guanidine nitrate
(5) 44.2 parts of sulfuric acid
(6) 38.1 parts of water (1) is placed in a suitable vessel equipped with means for agitation and means for indicating temperature and (2) and (3) are added thereto. The resulting slurry is heated with steam until solution occurs when (4) is added, causing the temperature to drop to about 65° C. where it is maintained for 10 minutes. The clear, water-white syrup is cooled immediately to 25° C. and (5) and (6) are slowly added while maintaining the temperature at 27°–33° C. The syrup has a viscosity of 3.0 poises.

Preparation of N,N'-dioctadecyl-alpha-2-hydroxyethylaminosuccinamide acetate (1) 635 parts of dimethyl maleate (4.41 mols)
(2) 284 parts of ethanolamine 95% (4.41 mols)
(3) 2394 parts of octadecylamine (8.82 mols+)
(4) 1558 parts of tert. butanol
(5) 265 parts of acetic acid (4.41 mols)

(1) and (2) and (4) are mixed together and heated under reflux by means of steam for 16 hours. (4) is then distilled off under reduced pressure up to a residue temperature of 60°–70° C. at about 100 mm.

(3) is then added, and the mixture is heated at 90°–100° C. for 24 hours with occasional agitation. The methanol formed in the reaction is distilled off until the residual product reaches a temperature of 100° C. at 10–20 mm. pressure. (5) is then added with through stirring and a homogeneous paste which is dispersible in water is obtained.

Anion action synthetic resins to which the process of the present is applicable include those described in U. S. Patent Nos. 2,285,750, 2,395,825, 2,341,907, 2,402,384 and 2,251,234 as well as those described and claimed in my copending application with James R. Dudley, Serial No. 616,644, filed September 15, 1945. Other anion resins to which the process may be applied include condensation products of acetaldehyde, formaldehyde and polyalkylene polyamines (Serial No. 643,836, filed January 26, 1946); of aminotriazine, aldehyde, and guanido compounds (Serial No. 607,277, filed July 26, 1945); of aminotriazine, aldehyde, strongly basic non-aromatic amines (Serial No. 649,127, filed February 20, 1946); of biguanide, carbonyl compounds and aldehydes (Serial No. 703,481, filed October 16, 1946); of crotonaldehyde, formaldehyde and polyalkylene polyamines (Serial No. 643,838, filed January 26, 1946); of polyepoxy compounds and alkylene polyamines (Serial No. 655,005, filed March 16, 1946); of glycerol dichlorohydrin and alkylene polyamines (Serial No. 624,606, filed October 25, 1945); of furfural, guanido compounds and carbonyl compounds (Serial No. 703,489, filed October 16, 1946); and of furyl aliphatic amines and aldehydes (Serial No. 642,416, filed January 19, 1946).

In general, the process is applicable to any condensation type anion active resin having a sufficiently rapid gelation rate for bead formation. When the gelation rate is too slow, the resin globules agglomerate before they become hardened by gel formation.

Cationic hydroxyalkyl amine salts containing a long chain (8-18 carbons) alkyl group and quaternary ammonium salts containing a long chain (8-18 carbons) alkyl group generally are useful as the surface active agent in the present process. Examples of such salts, in addition to those of the specific examples, include the compounds described in Patent No. 2,418,652 as, for example, the malate of the condensation product of a mixture of palmitic and stearic acids with ethanol and ethylene diamine, cetyltrimethylammonium bromide, alkyl pyridinium salts such as cetyl pyridinium bromide and cetyl pyridinium chloride, N(acyl colamino formylmethyl) pyridinium chlorides ("Emulsept"), gamma - stearamidopropyldimethyl - beta - hydroxyethylammonium chloride, the ethylene oxide addition products thereof, gamma-stearamidopropyldimethyl-glycerylammonium chloride, the compounds disclosed in U. S. Patent No. 2,268,395 and the like.

The optimum amount of cationic amine or quaternary ammonium salt used will vary, depending upon the rate and type of agitation, the non-solvent medium and particularly its density, the resin dispersant and particularly its viscosity, the desired bead size, etc. The minimum quantity of dispersing agent for any particular system is that amount which will keep the resin dispersed in the non-solvent medium; the maximum quantity is dependent upon the size of beads desired since, in general, the larger the quantity of dispersing agent the smaller the bead. In general, I use from about 0.005% to about 3%, based on the weight of non-solvent medium, of surface active agent.

Organic non-solvent media which may be used in the practice of the process of the present invention must be liquid at room temperature, insoluble in water, stable toward heat (up to about 70°–130° C. at least), not readily hydrolyzable and inert, i. e., nonreactive with the initial resin forming materials or the partial condensation products. In addition they should preferably boil above about 70° C. and have specific gravities substantially equivalent to those of the resin syrup, generally from about 1.1 to 1.5. The non-solvent media may each consist of a single compound, or they may be mixtures of two or more compounds as in Examples 1, 2 and 3 if the properties of the combination fit the necessary qualifications.

Following are some non-solvent media which may advantageously be used in the process of the present invention:

| | Boiling Point, °C. | Specific Gravity |
|---|---|---|
| propylidene dichloride | 87 | 1.143 |
| trimethylenedichloride | 123-5 | 1.201 |
| propylenechloride | 96.8 | 1.159 |
| 1,3-propylenedichloride | 109 | 1.204 |
| trichlorethylene | 87.2 | 1.466 |
| 1,1,2-trichlorethane | 113.5 | 1.441 |
| 1,1,1-trichlorethane | 74.1 | 1.325 |
| o-dichlorbenzene | 179 | 1.305 |
| ethylene dichloride | 83.7 | 1.256 |
| 1,2,4-trichlorbenzene | 213 | 1.446 |
| 3,3'-dichlorodi-n-propyl ether | 215 | 1.140 |
| sym. dichlorethyl ether | 178.5 | 1.222 |
| 2,2-dichlorethanol-1 | 146 | 1.145 |
| nitrobenzene | 211 | 1.205 |
| o-nitroethylbenzene | 227 | 1.126 |
| o-nitrophenetol | 275 | 1.191 |
| o-nitrotoluene | 223 | 1.163 |
| 1,2-dimethyl-3-nitrobenzene | 240 | 1.147 |
| p-fluorochlorbenzene | 130 | 1.226 |
| fluoronaphthalene | 212 | 1.133 |
| 1-bromohexane | 156 | 1.173 |
| 1-bromoctane | 188 | 1.099 |
| 1-brompropane | 71 | 1.353 |
| diphenyl ether | [1] 235 | 1.205 |

[1] 60 mm.

Non-solvent media of higher than the preferred specific gravity may be diluted with less dense liquids such as toluene and/or xylene until the density of the combination is substantially equivalent to that of the resin syrup and then used satisfactorily in the present process. A few of these media of higher specific gravity are

| | Boiling Point, °C. | Specific Gravity |
|---|---|---|
| sym. tetrachlorethane | 146.3 | 1.600 |
| sym. tetrabromethane | [1] 151 | 2.964 |
| 1,1,2-tribromethane | 188 | 2.579 |

[1] 54 min.

Furthermore, non-solvent media of lower than the preferred specific gravity may also be used if other variables of the system in question are modified to counteract the effect of the density differential between the resin and the non-solvent therefor. Such variables include, for example, the efficiency (rate and type) of agitation which should be stepped up and the viscosity of the resin syrup which should, if possible, be heavier. Preferred media of lower specific gravity include:

| | Boiling Point, °C. | Specific Gravity |
|---|---|---|
| toluene | 110.8 | 0.866 |
| o-xylene | 144 | 0.881 |
| m-xylene | 139.3 | 0.867 |
| p-xylene | 138.5 | 0.861 |
| 1,2,3-trimethylbenzene | 176.1 | 0.894 |
| 1,2,4-trimethylbenzene | 169.3 | 0.876 |
| 1,3,5-trimethylbenzene | 164.8 | 0.865 |
| ethyl benzene | 136.2 | 0.867 |
| isopropylbenzene | 152.5 | 0.862 |
| p-cymene | 176.7 | 0.857 |

In the event that an extremely inert non-solvent medium is required suitable liquids include xylene hexafluoride, xylene hexachloride, toluene trifluoride, those fluorcarbons and fluorochlorocarbons having the necessary boiling point and specific gravity, mixtures of these inert media with each other and with other media mentioned above as suitable.

The mechanical agitation taking place during the process of the present invention is very important. The degree and type of agitation must be sufficient to keep the dispersion from coagulating but it has a variable upper limit depending upon the size of beads desired and the practicality of producing them. With an anchor type stirrer, as used in the examples, a speed of from about 100-200 R. P. M. is generally preferred for the production of resin beads within a range suitable for use in ion exchange processes, i. e., from about 8-60 mesh, wet-screened, on a standard U. S. Sieve Series (U. S. Bureau of Standards, Standard Screen Series, 1919). However, the speed can go as high as about 600 R. P. M. in which case a much smaller bead is formed from a comparable resin syrup. Furthermore, in many cases variable speed agitation is desirable, gel formation being effected at relatively low speed followed by increased speed to prevent agglomeration of the dispersed particles during the cure. Impeller, impeller-baffle, turbine and other type agitating means may be substituted for the anchor type of the examples.

When extremely small or micro beads are desired, as for medicinal ion exchange application, a high agitation rate with relatively large amounts of surface active agent are critical factors. In addition, as the rate of agitation is increased, the viscosity of the resin solution may need to be increased in order for bead formation to take place.

The success of my process appears to depend at least in part on the establishment, under any given set of conditions, of an interfacial tension in the resin-medium system which is within a definite range conducive to the formation of spheroidal particles. My process is specific to the particular type surface active agent claimed, however, since not all surface active agents which produce an interfacial tension within the predetermined range will necessarily work. I have found that the cationic hydroxyalkyl amine salts and the quaternary ammonium salts disclosed in the present application are suitable for use in the preparation of phenol-formaldehyde condensation products containing omega sulfonic acid groups in spheroidal form according to the present process.

It may be desirable, according to the process of the present invention, to remove at least a portion of the water from the dispersed resin syrup in order to increase the reflux temperature of the system, particularly if the resin is to be cured in the non-solvent liquid or if it has a relatively slow rate of gelation.

Once gelation has occurred the resin beads are cured by heating in the presence or absence of a non-solvent liquid at from 50°-130° C., the preferred curing temperature within the range depending upon the particular resin. For instance I cure beads of epichlorohydrin-polyalkylene-polyamine resin at about 90°-130° C., preferably at about 100°-125° C.; beads of guanidine-melamine-formaldehyde resin at about 50°-110° C., and preferably in two stages, the first around 50° C. and the second around 100° C.

The process of the present invention may be applied to the preparation of dyes, pigments, catalysts and ionic or non-ionic resinous materials in the form of spheroidal or micro-spheroidal particles which, because of their spheroidal nature, possess special advantages over the corresponding granular products.

Similar processes applied to other type resins and/or other type surface active agents are described and claimed in the copending application of Arthur S. Nyquist, Serial No. 77,071, filed February 17, 1949, entitled "Preparation of Non-Nuclearly Sulfonated Phenol-Formaldehyde Resin in Bead Form" and in my copending applications identified below:

| Serial No. | Filing Date | Title |
|---|---|---|
| 77,070 | February 17, 1949 | Preparation of Nuclearly Sulfonated Phenol-Formaldehyde Resin in Bead Form. |
| 77,069 | do | Use of Non-Ionic Surface Active Agent in Preparation of Anionic Resin in Bead Form. |
| 77,067 | do | Use of Petroleum Sulfonates in Preparation of Resinous Condensation Products in Bead Form. |

I claim:

1. A process which comprises dispersing an aqueous syrup of a partially condensed resin capable of being cured to a water-insoluble anion active product in an inert, organic non-solvent liquid which has a boiling point of at least 70° C. and the density of which is substantially equivalent to that of said aqueous syrup, with mechanical agitation in the presence of a cationic surface active agent selected from the group consisting of quaternary ammonium salts containing an alkyl group of from 8-18 carbon atoms and hydroxyalkyl amine salts containing an alkyl group of from 8-18 carbon atoms, heating the dispersion until the temperature of gelation of the resin is attained, and finally curing the gelled resin obtained by heating, sufficient agitation being provided throughout the heating to prevent coagulation of the dispersion.

2. A process according to claim 1 in which the anion active product is a condensation product of a polyalkylene polyamine with epichlorohydrin.

3. A process according to claim 1 in which the anion active product is a condensation product of guanidine, melamine and formaldehyde.

4. A process according to claim 1 in which water is azeotropically removed from the resin during the pre-cure heating, and the beads are then cured by heating the dispersion under flux.

5. A process according to claim 1 in which the gelled resin beads are separated from the non-solvent liquid and then cured by heating in an oven.

6. A process according to claim 1 in which the non-solvent liquid is a chlorinated hydrocarbon.

7. A process according to claim 1 in which the surface active agent is a quaternary ammonium salt containing an alkyl group of from 8 to 18 carbon atoms.

8. A process according to claim 1 in which the surface active agent is a hydroxyalkylamine salt containing an alkyl group of from 8 to 18 carbon atoms.

LENNART A. LUNDBERG.

REFERENCES CITED

The following references are of record in the file of this patent:

UNITED STATES PATENTS

| Number | Name | Date |
|---|---|---|
| 2,469,683 | Dudley et al. | May 10, 1949 |
| 2,518,420 | Evers | Aug. 8, 1950 |

FOREIGN PATENTS

| Number | Country | Date |
|---|---|---|
| 585,538 | Great Britain | Feb. 11, 1947 |